April 1, 1930.   J. DE BEAUMONT ET AL   1,752,632
APPARATUS FOR PRODUCING ELECTRIC WAVES
Filed March 23, 1927   5 Sheets-Sheet 2
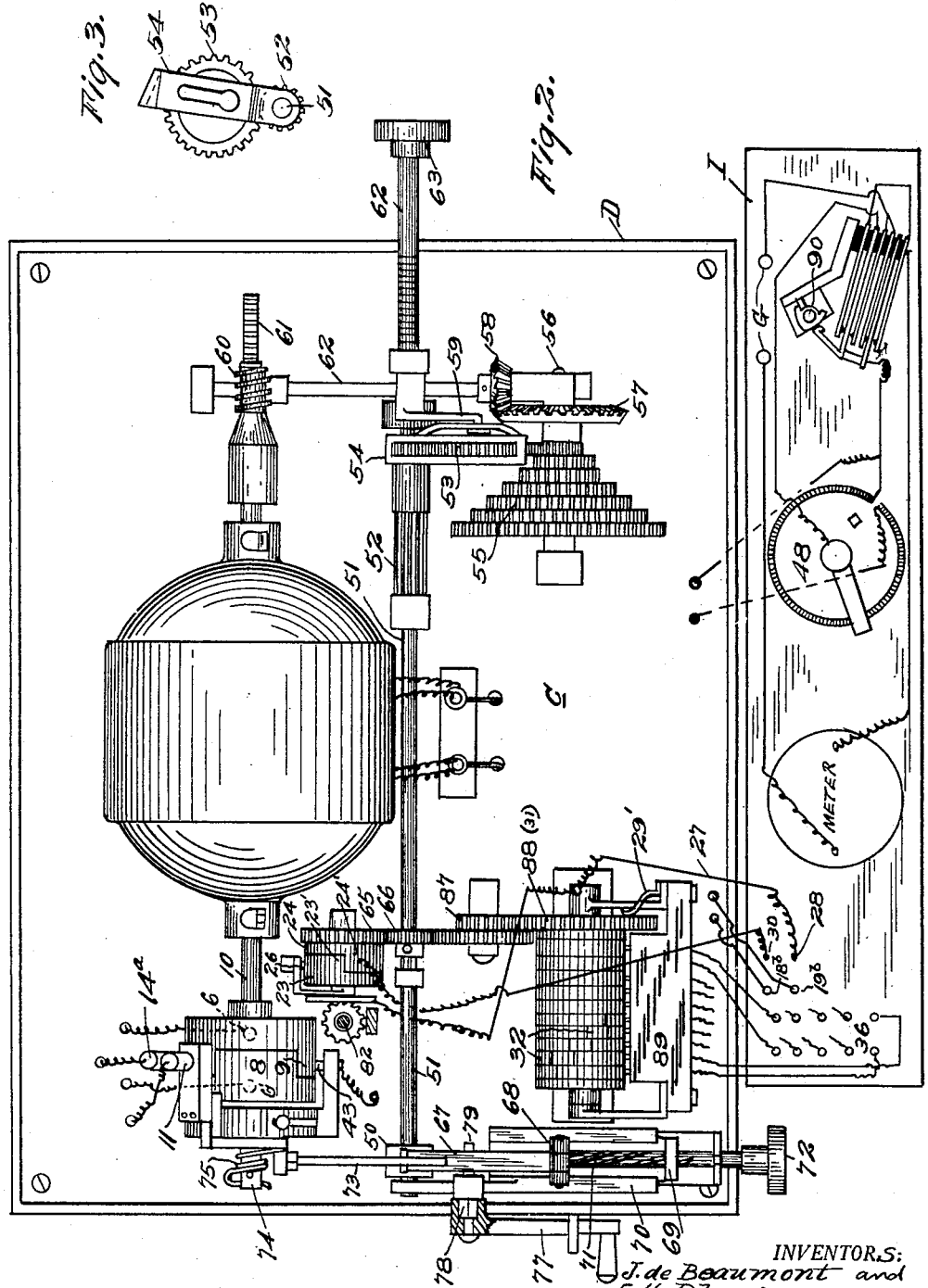

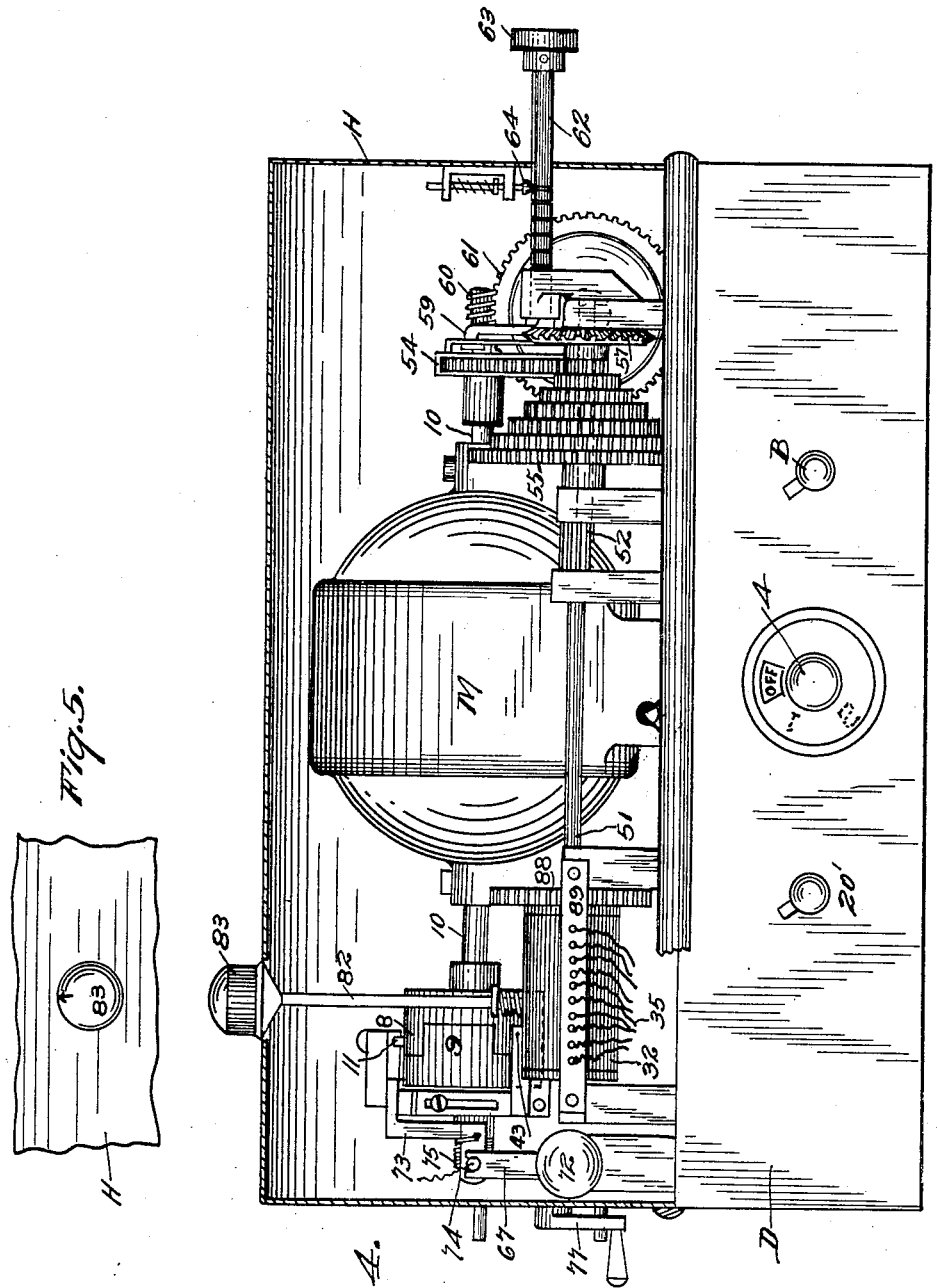

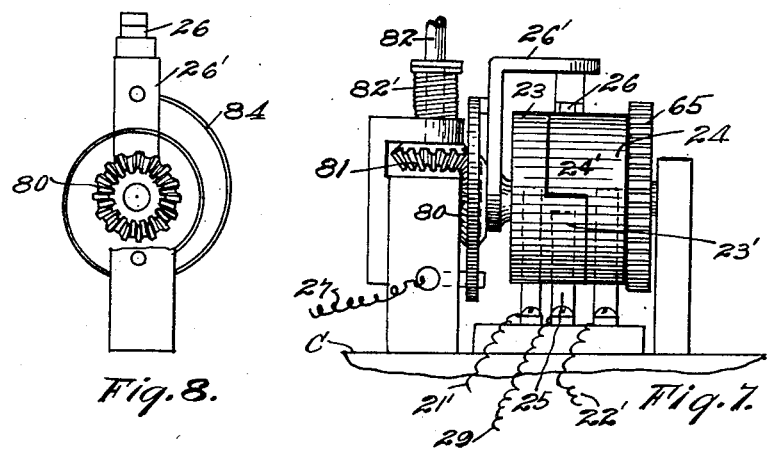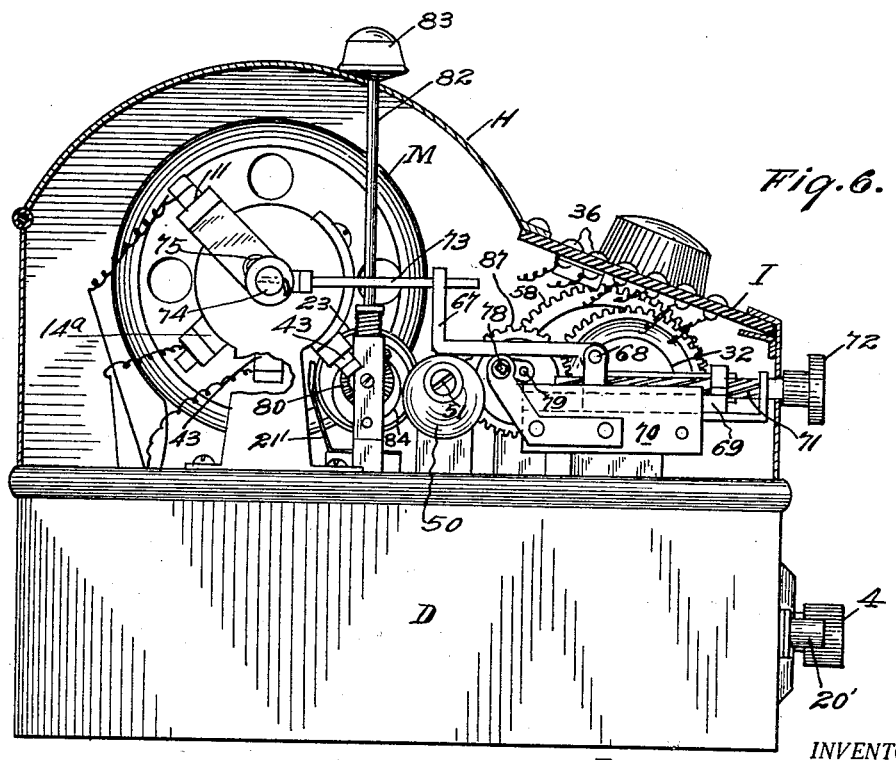

April 1, 1930.  J. DE BEAUMONT ET AL  1,752,632
APPARATUS FOR PRODUCING ELECTRIC WAVES
Filed March 23, 1927   5 Sheets-Sheet 5
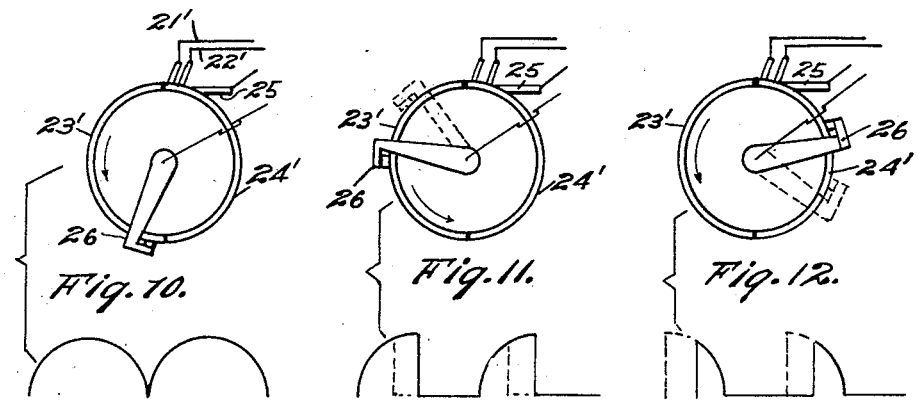
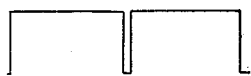
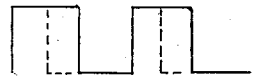
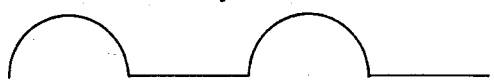
INVENTORS:
J. de Beaumont and
E. H. Blum,
BY
ATTORNEY Patented Apr. 1, 1930

1,752,632

UNITED STATES PATENT OFFICE

JULIEN DE BEAUMONT, OF HUNTINGTON PARK, AND EDWARD H. BLUM, OF LOS ANGELES, CALIFORNIA

APPARATUS FOR PRODUCING ELECTRIC WAVES

Application filed March 23, 1927. Serial No. 177,659.

This invention relates to therapeutic apparatus, and more especially to a method and means for producing remedial electric wave currents.

This invention is of a nature possessing a great many purposes, features and capabilities and a few of the objects will be briefly mentioned in an introductory manner to enable the more ready comprehension of the field of utility and adaptation of the invention in therapeutic practices; it being understood that, in addition to the directly mentioned objects, other features and advantages will become apparent in the general description of the invention and it is reserved that numerous modifications, variations and adaptations may be resorted to within the spirit, scope and principle of the herein claimed invention.

One of the more conspicuous objects of this invention is to produce an electromotive force for therapeutic purposes, which is of variable potential, of no chemical reaction and which is effective to produce muscular contraction of variable degree without stinging sensation to the patient. Another object is to produce a high frequency current of low potential without the use of a spark gap or oscillating tubes, and to produce a non-polar current (oscillating).

A further object is to produce an oscillatory, uniform current the intensity of which can be varied, and which can be of low potentiality, preferably.

An additional object is to provide for the production of an oscillatory varying, wave current, which can be regulated in electromotive force.

An object is to provide for selecting electromotive force from zero to any degree in the 180° of the wave and suddenly dropping or stopping the remainder of the wave, and also an object is to provide for the cutting in, by sudden contact, on any given part of the wave and obtaining a subsequent gradual decrease to zero.

Another object is to provide for suddenly cutting in on a wave and then maintaining a desired intensity for a desired period and then dropping suddenly.

A further object is to provide for the rectification of alternating current to produce galvanic current.

An embodiment of apparatus for the practice of the method herein set forth is illustrated on the accompanying drawing, wherein:

Figure 2 is a plan of the operative mechanism; parts being in section.

Figure 3 is a detail of a change speed gear element.

Figure 4 is a front elevation of the machine; its cover being in vertical section.

Figure 5 is a plan of a portion of the cover and a control knob.

Figure 6 is an end elevation of the machine; the cover being in cross-section.

Figure 7 is a detail view of a wave modifying commutator.

Figure 8 is a side view of a spiral lead connection for the commutator.

Figure 9 is a diagram of a produced wave.

Figures 10, 11 and 12 show different positions of the adjustable brush of the modifying commutator and graphs of respective, produced varying and constant waves.

Figure 1:
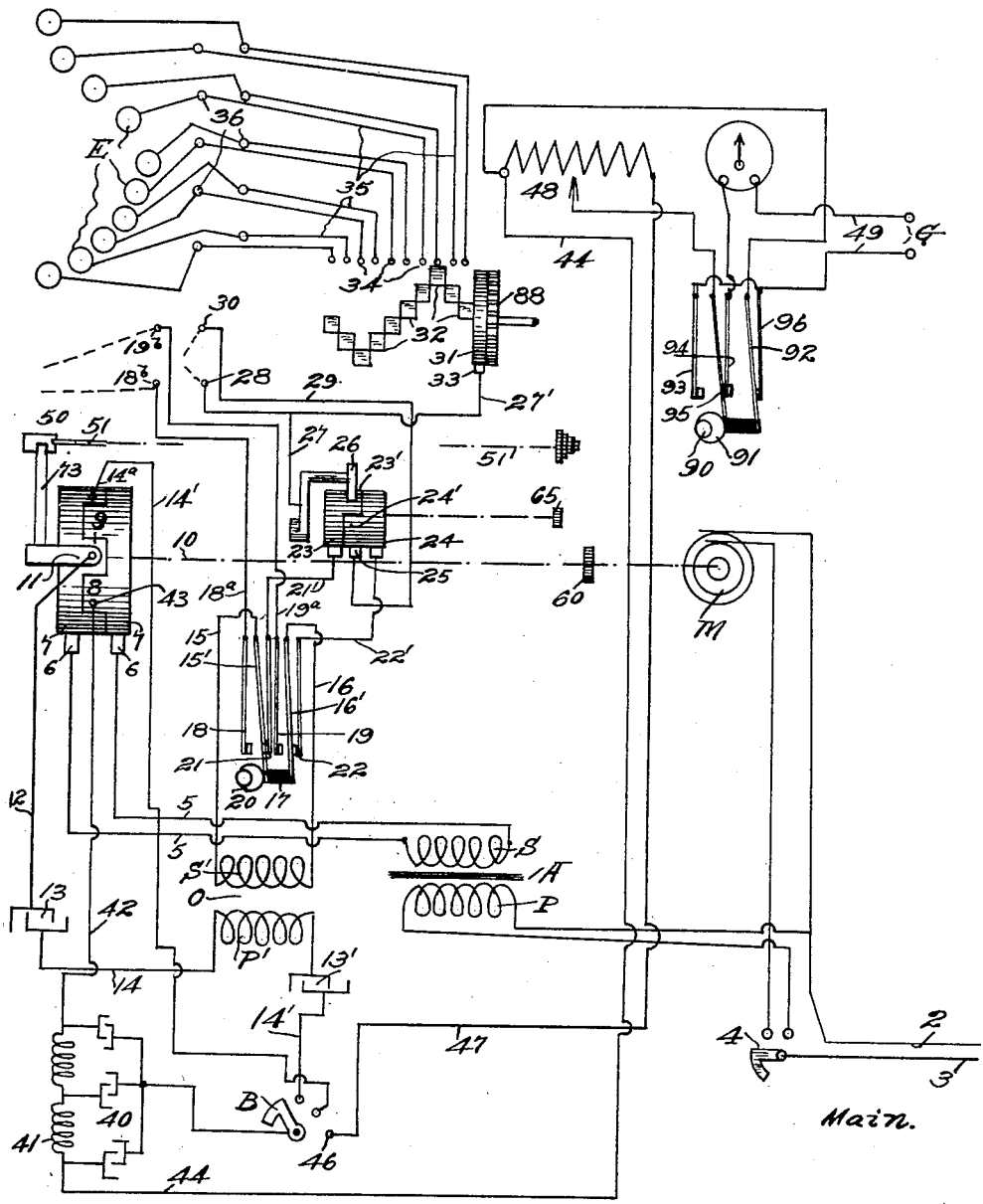
Figure 1 is a diagram of the electrical and mechanical system.

Figures 13—14 show different wave forms produced.

The diagram, Fig. 1, shows completely the general scheme of the apparatus and reference will be made to it for readiness of disclosure:

Main lines 2—3 lead to an A. C. synchronous motor M and to a closed core, static transformer primary P and a two-way, single pole switch 4 first cuts in the motor M and then closes the primary P. This is to allow the motor to get to synchronism, preferably, before the static transformer A is excited. The secondary coil S of the master transformer A is connected by lines 5—5 to stationary slip-ring brushes 6—6 bearing on rotating slip rings 7—7 (insulated relatively) and which have alternated center sections 8—9, forming a commutator fixed to the shaft 10 of the motor M and driven thereby.

Current from the transformer A is broken up into pulsating, unidirectional impulses by a variable or controlling brush 11 and is led by wire 12 to condenser 13 whose output is carried by wire 14 to the primary P' of an oscillating current, open core transformer O, having a return wire 14' and a condenser 13', then to fixed brush 14ª engaging segments 8—9. A current selecting switch B opens or closes the line 14' to energize coil P'.

This excites the secondary S' which has lines 15—16 to switch blades 15'—16' which are mechanically connected (and insulated) at 17 to act together. In one position the blades engage contacts 18—19 which have wires 18ª—19ª to plug sockets 18ᵇ—19ᵇ so that the oscillatory current induced in transformer O can be delivered directly (by electrodes) to the patient.

It may be stated here that the secondary S' is preferably within the primary coil P', and preferably the secondary is made of wire of a size not finer than #12 B. & S. gage.

When desiring to modify the characteristics of the wave from the oscillatory transformer O the switch blades 15'—16' are thrown by a suitable means, as cam 20 so that contacts 21—22 of lines 21'—22' are respectively energized. These lines have brushes in set position as to relative slip rings 23—24 having central, staggered half-sections 23'—24' engaged by a standing brush 25 and an adjustable brush 26 which has a line 27 to plug outlet 28. The brush 25 has a line 29 to an outlet 30. From this it will be seen that by adjusting the brush 26 to or from the fixed companion brushes the waves of the oscillating current from the transformer O will be modified, broken or short-circuited at any desired point in the wave or electromotive force as seen in Figs. 10, 11 and 12.

In some cases it is found desirable to apply a battery of electrodes E, Fig. 1, and to supply electricity to these in an individual charge successively one after another. To that end the line 27 is branched at 27' and diverts current from the outlet 28 to a distributor having a helix of joined contacts 32 taking current from a ring 31 engaged by a wiper 33 to which line 27' connects. The contacts 32 are successively respectively engaged by coordinate brushes 34 which have lines 35 to outlets 36 to which are attachable the cords of the electrodes E.

It will now be obvious that by means of the cam-switch 15'—16', an oscillating current from the transformer O can be delivered to the outlets 18ᵇ—19ᵇ, or a modified current through the wave changer 23—24 can be sent to outlets 28—30, and 28—36.

The current selecting switch B has a pole wired to a set of condensers 40 which are connected to inductance coils 41 having a line 42 to a stationary brush 43 engaging the commutator segments 8—9.

The switch B is movable to break the line 14' and to engage contact 46 of line 47 to a rheostat 48 from which a line 44 returns to coils 41. From the rheostat extend lines 49 to outlets G from which galvanic current can be taken from the present generator.

During operation, alternating current is delivered from the static transformer A to the master rectifying commutator 8—9 and by this is transformed into pulsating, unidirectional current which is impressed on condensers 13—13' and on the primary coil P' of transformer O producing oscillating current. From the secondary coil S' of this transformer the oscillatory or high frequency current passes at outlets 18ᵇ—19ᵇ to the patient, or through the modifying transformer 23—24 to outlets 28—30, 28—36. A certain amount of oscillation will be set up in circuit 40—41 but this will not interfere with circuit 14—14'.

The effect of the variable brush 11 of the master commutator is to vary the electromotive force to the condensers 13—13', and coil P'. We produce a change in the wave from the static transformer through the adjustable brush of the master rectifying commutator, without use of variable chokes or variable resistances. This wave is produced as a consequence of a variable electromotive force being imposed on the condenser 13. In other words, when the movable brush 11 is at 90°, in this case, (a four-point rectifying commutator) from brush 14ª charging and discharging of the condensers is at its lowest point. When the brush 11 is moved towards brush 14ª a selected potential above zero is impressed on the condensers thereby charging same to a higher capacity and the consequent discharge through the oscillatory transformer results in a higher impressed electromotive force in the secondary. Unidirectional, pulsating current of variable starting potential passes from brush 11, along line 12, to condenser 13, discharging to the primary P of transformer O, thence to condenser 13', to line 14', over switch B to line 14' and brush 14ª. Secondary, induced oscillatory current is produced in the secondary of transformer O, to lines 15—15', 21—21', 23—23', 26 to 28 and 16—16', 22—22', 24, 25, 29 to 30, and 28—30 to patient. The higher the starting electromotive force the higher the induced potential. From this it will be seen that when the position of the movable brush 11 is varied automatically to and from the normal position, a rhythmic wave will be produced in the oscillatory transformer conforming to the speed with which the brush is oscillated. By holding the brush 11 in selected stationary position the induced potential is constant, varying according to the selected position of the brush. The wave control brush actuator has definite time relation to the segments of the wave modifying commutator 23—24 which, also, is in timed relation with sections of the multiple distributor 32. This timed relation is had by means, as a cam 50, whose low point is coordinate to a position of the stationary brush 25 touching its two commutator sections evenly.

The operating mechanism

The rectifying commutator 8—9 is fixed and insulated on one end of the motor shaft 10 whose other end carries a worm 60 engaging a reducing gear 61 fixed on shaft 62 which passes under a shaft 51 carrying the brush actuating cam 50. The cam shaft 51 has a variable speed relation as to the motor and commutator 8—9 for the purpose of producing more or less waves in any given period of time by accelerating or decelerating the rate of oscillations of the brush 11. Suitable means may be employed for such change speed function. As here shown the cam shaft 51 has an elongated pinion 52 engaged by a shift-gear 53 in a frame 54 pivoted and slidable along the shaft 51 so as to selectively engage one or another of step-gears 55 on a shaft 56. This shaft is geared at 57—58 to the counter shaft 62.

It is understood that the several shafts are provided with suitable bearings which are fixed on a base or plate C forming the top of a box D inclosing the coils, chokes and condensers.

The sliding frame 54 has a sliding crank lever 59 on a spindle 62 which extends out through one end of a top housing H and has a knob 63 for manipulation to select gears 55. The spindle engages a detent 64 in its several gear meshing positions.

Pretimed relation is made between the modifying transformer 23—24 and the cam shaft 51 by means of two-to-one gears 65 and 66, the latter on the cam shaft. The low point of the cam 50 is in coincidence with an even contact of brush 25 on its sections 23'—24' irrespective of the speed of the shaft 51.

This timed relation is to determine the timing of automatic rise and fall of impulse from the rectifying commutator 8—9 and which impulses are impressed upon the condenser 13 and oscillating transformer O for the purpose of generating waves therefrom. Automatic means to actuate the brush 11 here includes the cam 50 which engages and lifts a lever 67 pivoted at 68 in a carriage 69 in guides 70. The carriage is adjustable by a hand-screw 71, having an outside handle 72, for the purpose of changing point of leverage of the lever 67 on an arm 73 which is connected to and tilts the brush 11 about a journal 74. The brush arm 73 is pulled down to lever 67 by a spring 75. Hence, when cam 50 is lifting lever 67 this elevates the brush arm 73 for a stroke which is varied in degree by the relation of lever 67 to the journal 74. When the carriage 69 is set out from the journal the brush 11 is given minimum oscillations from its normal, low potential relation on the commutator, and inward setting of the carriage increases the oscillation stroke and thereby the E. M. F. impulse. The mechanical (automatic) action of the cam on the brus 11 produces a rhythmic impulse whose E. M. F. is determined by the amplitude of its stroke.

Means are provided to render the cam 50 ineffective on the brush moving means so that a sustained or constant E. M. F impulse will be delivered to the condenser 13 and the transformer O. This is effected by a hand lever 77, of limited swing, fixed on a rock-shaft 78 having a dog 79 movable up to lift the elevating lever 67 to an idle position above the high point of the cam 50, so that this, though running, will be ineffective on the lever 67. It is only necessary to shift the carriage 70 by handle-screw 71 to increase or decrease the constant potential impulse from the rectifying commutator.

The rythmic oscillating current induced in the coil S' can be tapped off at outlets $18^b$—$19^b$ in relative constant potential impulses by throwing switch blades 15'—16' to contacts 18—19, or can be diverted through the modifying transformer 23—24 by which the waves are altered in characteristics, as shown in Figs. 10, 11 and 12, by cutting in or cutting out at different portions of the waves. To obtain this modification means are provided to shift the controlling brush 26. The brush has an arm 26' with a pinion 80, coaxial with the rings 23—24, meshing with a gear 81 on a stem 82 which extends up through the housing H and has an operating knob 83. To insure a good circuit connection the arm 26' has a spiral lead 84 solidly connected to a binding post from which wire 27 leads off. By means of gears 65—66 the commutator rings 23—24 are invariably timed with the shaft 51. A friction-making spring 82' holds the stem 82 from change of set position due to drag by the brush 26.

Current pulses from the modifying commutator 23—24 to the distributor contacts 32 are timed by a gear train 87, from gear 66 on shaft 51, to a gear 88, which may include slip ring 31 for the brush 33. The gang of distributor brushes 34 is arranged in a bridge 89 from which the leads 35 run to the outlets 36 for the attachment of the electrodes E.

On the front face of the box D is arranged the main switch 4, the master switch for selecting oscillating or galvanic current, and the modifying switch cam button 20' of the cam 20. In the face of the housing is a panel I on which is mounted the galvanic rheostat 48, a pole changing switch 90, the bank of outlets 36, $18^b$—$19^b$, 28—30, and the milliamperemeter.

The pole changing switch 90 operates a cam 91 controlling blades 92 of the pole changer contacts 93, 94, 95, 96 which are connected to the rheostat, the meter and the outlets G.

When using direct current a rotary converter is employed instead of the synchronous motor M.

Therefore, by the present method and apparatus when the primary coil P of the static transformer A is excited the induced electromotive force of the coil S flows to and is rectified by the commutator 8—9 to a pulsating, unidirectional current which charges the condenser 13, whose oscillatory discharges excite the primary coil P' of the oscillatory transformer O. This produces pulsating waves in the output coil S' primarily regulated by the brush 11. The waves from the coil S' are subject to further modification, as shown in Figs. 10, 11 and 12 by being caused to pass through the modifying commutator 24—23 under control of the regulating bush 26, to produce gradual rise and fall of the wave force, or gradual rise and sudden fall, or vice verse. Constant force waves of variable periods are shown in Figs. 13 and 14. A further produced wave character is shown in Fig. 9.

What is claimed is:

1. In combination, a closed core, static transformer, an alternating current rectifying means, a wave discharging air core transformer, a condenser means receiving the current from the rectifying means and discharging waves to the latter transformer, and adjustable, operative means for varying and rhythmically increasing and decreasing the electromotive force from the rectifying means.

2. In combination, an alternating current rectifying means, a wave discharging transformer, a condenser means receiving the current from the rectifying means and discharging waves to the transformer, and manually adjustable means for varying and rhythmically increasing and decreasing the electromotive force from the rectifying means and automatic means for effecting the rhythmic action.

3. Apparatus for producing electric waves, comprising an alternating current transformer, rectifying commutator means connected to the secondary thereof, a condenser connected to the said means to take rectified current, a second transformer for the output from the condenser, and means to determine wave character of the output from the second condenser and including modified current electrodes and unmodified current electrodes and selective means therefor.

4. Apparatus for producing electric waves, comprising an alternating current closed core transformer, rectifying means connected to the secondary thereof, a condenser connected to the said means, a second transformer excited by the output from the condenser, means including a commutator and a selector switch to determine wave character of the output from the second condenser, and means to regulate the starting electromotive force from the rectifying means to the condenser.

5. Apparatus for producing electric waves, comprising an alternating current transformer, rectifying means connected to the secondary thereof, a condenser connected to the said means, a second transformer excited by the output from the condenser, and commutator means to determine wave character of the output from the second transformer, and including a device to suddenly cut in upon or to suddenly cut off a wave at any degree.

6. Apparatus for producing electric waves, comprising an alternating current transformer, rectifying commutator means connected to the secondary thereof, a condenser connected to the said means, a second transformer excited by the output from the condenser, and commutator means to determine wave character of the output from the second transformer, and means for synchronizing the rectifying means and the wave character determing means.

7. Apparatus for producing electric waves, comprising an alternating current closed core transformer, rectifying and regulating means connected to the secondary thereof, a condenser connected to the said means, a second transformer connected to the condenser means to determine wave character of the output from the second transformer, and means for synchronizing the rectifying means and the wave character determining means, and mechanism to selectively increase or decrease the number of wave impulses in a given period of time from the regulating means.

8. In an electric wave generating apparatus, an alternating current transformer, a rotary rectifying commutator having an adjustable brush, a condenser which is chargeable with a rectified current of variable electromotive force from the commutator, an open core oscillating transformer connected to the condenser and means for manually setting the brush to obtain constant electromotive force impulses from the commutator.

9. In an electric wave generating apparatus, an alternating current transformer, a rotary rectifying commutator having an adjustable brush, a condenser which is chargeable with a rectified current of variable electromotive force from the commutator, and means for automatically vibrating the brush to obtain a rhythmic wave from the commutator and including a mechanism operative on the brush.

10. In an electric wave generating apparatus, an alternating current transformer, a rotary rectifying commutator having an adjustable brush, a condenser which is chargeable with a rectified current of variable electromotive force from the commutator, means for automatically vibrating the brush to obtain a rhythmic wave from the commutator, and selective means for changing the number of waves delivered to attached controls in a given period.

11. In an electric wave generating apparatus, an alternating current transformer, a rotary rectifying commutator having an adjustable brush, a condenser which is chargeable with a variable rectified current of variable electromotive force from the commutator, means for automatically vibrating the brush to obtain a rhythmic wave from the commutator, and selective means for charging the number of waves delivered in a given period, and means for rendering the automatic means ineffective.

12. In an electric wave generating apparatus, an alternating current closed-core transformer, a rotary rectifying commutator having an adjustable brush and means to move the brush to vary the current, a condenser chargeable with rectified current of variable force from the commutator, a second, air-core transformer chargeable by the condenser, a rotary commutator receiving discharge from the second transformer and having an adjustable brush to modify the output therefrom, and means for synchronizing the commutators.

13. In an electric wave generating apparatus, an alternating current transformer, a rotary rectifying commutator having an adjustable brush, a condenser chargeable with rectified current from the commutator and means to move the brush to vary current force, a second transformer which is chargeable by the condenser, a rotary commutator receiving current from the second transformer and having an adjustable brush to modify the current therefrom, said commutators being synchronized, and means for manually setting the modifying brush.

14. In an electric wave generating apparatus, an alternating current closed-core transformer, a rotary rectifying commutator having an adjustable brush, a condenser chargeable with rectified current from the commutator, means to move the brush for varying the current force, an air-core transformer chargeable by the condenser, a rotary commutator receiving current from the latter transformer and having an adjustable brush to modify the waves therefrom, means for manually setting the modifying brush, and a selective switch for cutting in either the unmodified or the modified current from the apparatus.

JULIEN DE BEAUMONT.
E. H. BLUM.